United States Patent
Suzuki

[11] Patent Number: 5,908,363
[45] Date of Patent: Jun. 1, 1999

[54] RATCHET TYPE TENSIONER WITH BUFFER MECHANISM

[75] Inventor: Tadasu Suzuki, Tokyo, Japan

[73] Assignee: Tsubakimoto Chain Co., Osaka-fu, Japan

[21] Appl. No.: 08/864,060

[22] Filed: May 27, 1997

[30]     Foreign Application Priority Data

Jun. 13, 1996   [JP]   Japan ................................. 8-152639

[51] Int. Cl.⁶ ........................................................ F16H 7/08
[52] U.S. Cl. ........................ 474/101; 474/109; 474/111; 474/136
[58] Field of Search .................... 474/101, 109, 474/110, 111, 136

[56]             References Cited

U.S. PATENT DOCUMENTS

| | | | |
|---|---|---|---|
| 4,772,251 | 9/1988 | Goppelt et al. | 474/101 |
| 4,986,796 | 1/1991 | Kawashima et al. | 474/101 |
| 5,184,982 | 2/1993 | Shimaya et al. | 474/101 |
| 5,248,282 | 9/1993 | Suzuki | 474/110 |
| 5,304,099 | 4/1994 | Deppe et al. | 474/110 |
| 5,607,368 | 3/1997 | Hida et al. | 474/110 |
| 5,632,474 | 5/1997 | Hayakawa et al. | 474/110 X |
| 5,707,309 | 1/1998 | Simpson | 474/110 |
| 5,720,684 | 2/1998 | Mott | 474/110 |

*Primary Examiner*—Donald P. Walsh
*Assistant Examiner*—Emmanuel M. Marcelo
*Attorney, Agent, or Firm*—Dann, Dorfman, Herrell and Skillman; Henry H. Skillman

[57]                ABSTRACT

A ratchet type tensioner with a buffer mechanism is capable of buffering an impact force applied from a chain side to a plunger, irrespective of the amount of backlash in a ratchet mechanism, and is capable of exhibiting an excellent effect of suppressing vibration of the chain. An inner plunger is inserted in a protrudable and retractable manner into an outer plunger whose backward movement is restricted by a ratchet mechanism. The inner plunger is urged in its protruding direction by means of an inner plunger spring more powerful than a plunger spring which urges the outer plunger in the protruding direction. At one end of inner plunger is an oil storage chamber in communication with a high pressure chamber at the opposite end of the inner plunger through a check valve. A clearance path is provided between the two chambers to allow oil in the high pressure chamber to bypass the check valve and flow through the clearance path.

5 Claims, 5 Drawing Sheets

5,908,363

RATCHET TYPE TENSIONER WITH BUFFER MECHANISM

FIELD OF THE INVENTION

The present invention relates to a ratchet type tensioner for applying a tension to a driving chain.

BACKGROUND OF THE INVENTION

Heretofore, for example in a chain drive for transmitting the rotation of a crank shaft in an engine to a cam shaft, there has been used, for example, a tensioner such as described in Japanese Patent Publication No. 8415/91 to impose an appropriate tension on a chain and thereby suppress vibration of the chain during operation thereof.

FIG. 3 illustrates the structure of the above conventional tensioner. As shown, a plunger P is urged in a projecting direction from a housing H by means of a spring S. Ratchet teeth T are formed on the outer peripheral surface of the plunger P, and a ratchet pawl G provided on the housing H side is brought into engagement with a ratchet tooth T to restrict the retraction of the plunger P and resist any impact force applied to the plunger P from a chain C through a tensioner lever L, thereby suppressing vibration of the chain.

FIG. 4 shows another example of a conventional tensioner, which is constituted by a combination of the aforementioned ratchet type tensioner with a buffer mechanism using the flow resistance of oil.

According to the structure of this conventional tensioner, backlash is permitted between ratchet teeth T and a ratchet pawl G, and oil is fed from the exterior into the interior of the plunger P through a check valve V. When the plunger P experiences an impact force from a tensioner lever L, the plunger retracts within the range of the backlash against the biasing force of a spring S in an engaged state of the ratchet pawl G with a ratchet tooth T. At this time, the check valve V closes, causing the oil filled in the interior of the plunger P to leak from between the outer peripheral surface of the plunger and the inner peripheral surface of a plunger receiving hole N to buffer the impact force.

FIG. 5 shows a still another example of a conventional tensioner, in which a sub plunger P' is mounted in a protrudable and retractable manner to the protruding end of the plunger P in the foregoing ratchet type tensioner of the structure shown in FIG. 3, the sub plunger P' being urged so as to protrude forward by a spring S'.

According to this conventional tensioner, when an impact force is exerted on the front end face of the sub plunger P' from a chain C through a tensioner lever L, the sub plunger P' retracts with respect to the plunger P, while the impact force is buffered by the spring S'. The spring S' has a biasing force stronger than that of the foregoing spring S, whereby the front end face of the sub plunger P' is normally in a protruded position from the front end of the plunger P.

However, in the tensioner of the structure shown in FIG. 3, the retraction of the plunger is restricted merely by the ratchet mechanism, and there is a limit to the amount of backlash between the ratchet teeth and the ratchet pawl. Accordingly, there is obtained scarcely any buffer effect against an impact force applied from the chain to the front end of the plunger through the tensioner lever L, and hence it is impossible to suppress vibration of the chain.

Even in such a combined structure of a check valve with the ratchet mechanism as shown in FIG. 4, it is impossible to fully utilize the buffer action of oil because a limit is encountered in the amount of backlash between the ratchet teeth and the ratchet pawl.

Further, in the structure shown in FIG. 5 wherein a sub plunger is mounted to the front end of the plunger, the sub plunger retracts easily relative to the plunger upon application of an impact force to its front end, thus making it impossible to fully suppress vibration of the chain.

SUMMARY OF THE INVENTION

Accordingly, it is an object of the present invention to solve the above-mentioned problems of the prior art and provide a ratchet type tensioner with a buffer mechanism capable of buffering an impact force applied to a plunger from the chain side, irrespective of the amount of backlash in a ratchet mechanism, and thereby exhibiting an excellent suppressing effect against vibration generated on the chain side.

According to the present invention, in order to achieve the above-mentioned object, there is provided a ratchet type tensioner having a plunger inserted in a protrudable and retractable manner into a plunger receiving hole formed in a housing, the plunger being urged in a protruding direction from the plunger receiving hole, with a retracting displacement of the plunger into the plunger receiving hole being restricted by a ratchet mechanism, wherein the plunger comprises an outer plunger inserted into the plunger receiving hole and an inner plunger inserted into a bottomed, inner plunger receiving hole and capable of protruding and retracting in the same direction as the extending direction of the outer plunger, the inner plunger receiving hole being formed inside the outer plunger and being open to an end face on the protruding side of the outer plunger.

In the above ratchet type tensioner, according to a first aspect of the present invention, the inner plunger is urged in the protruding direction from the inner plunger receiving hole by means of an inner plunger spring having a biasing force stronger than that of the foregoing plunger spring, an oil storage chamber is formed in the interior of the inner plunger at one of its ends, the oil storage chamber being in communication through a check valve with a high pressure chamber formed between the bottom of the inner plunger receiving hole and the inner plunger at it opposite end, the check valve blocks the flow of oil from the high pressure chamber side to the oil storage chamber side so that, when an impact load is imposed on the protruding end of the inner plunger, the oil filled in the high pressure chamber leaks through a clearance between the inner peripheral surface of the inner plunger receiving hole and the outer peripheral surface of the inner plunger to buffer the impact load.

In the above ratchet type tensioner, according to a second aspect of the present invention, the inner plunger has a bottomed, cylindrical hole which is open to an end face of the inner plunger on the side opposed to the inner plunger receiving hole; an inner plunger spring having a biasing force stronger than that of the plunger spring, a check valve plug, and a hollow sleeve, are inserted into the said cylindrical hole, successively in the said order from the bottom side of the cylindrical hole and slidably in abutment with one another; the check valve plug is formed in a cylindrical shape having an outer peripheral surface conforming to the inner peripheral surface of the cylindrical hole, both end faces of the check valve plug being in communication with each other through a check valve; the hollow sleeve projects into the inner plunger receiving hole and its projecting end is in abutment with the bottom of the inner plunger receiving hole; the inner plunger is urged in a direction of projecting to the exterior from the inner plunger receiving hole by means of the inner plunger spring; a high pressure chamber is formed at one end of the inner plunger between the bottom of the cylindrical hole and the check valve plug, and an oil storage chamber is formed at the opposite end of the inner plunger by the internal space of the hollow sleeve; and the check valve blocks the flow of oil from the high pressure chamber side to the oil storage chamber side so that, when an impact load is imposed on the protruding end of the inner plunger, the oil filled in the high pressure chamber passes through a clearance between the inner peripheral surface of the cylindrical hole and the outer peripheral surface of the check valve plug and leaks to the oil storage chamber side to buffer the impact load.

According to the ratchet type tensioner with a buffer mechanism in the first aspect of the present invention, when an impact force is applied from the chain side to the inner plunger further projecting from the front end of the plunger projecting from the housing, the impact force acts to retract the inner plunger with respect to the outer plunger against the biasing force of the inner plunger spring because the outer plunger is restricted its retracting motion by the ratchet mechanism. At this time, the pressure of the oil filled in the inner plunger receiving hole increases, so that the check valve is closed.

Consequently, the oil pressure in the inner plunger receiving hole further increases and leaks to the exterior through the clearance between the inner peripheral surface of the inner plunger receiving hole and the outer peripheral surface of the inner plunger, while the energy of the above impact force is consumed by the flow resistance of the oil to create a buffer effect, whereby the vibration of the chain is suppressed.

According to the ratchet type tensioner with a buffer mechanism in the second aspect of the present invention, an impact force when applied to the inner plunger from the chain side acts to retract the inner plunger with respect to the outer plunger against the biasing force of the inner plunger spring.

However, since the hollow sleeve is disposed between the check valve plug and the bottom of the outer plunger receiving hole, the distance between the bottom of the outer plunger receiving hole and the check valve plug is maintained constant, so that with retraction of the inner plunger, the oil pressure in the high pressure chamber increases to close the check valve.

As a result, the oil pressure in the high pressure chamber further increases and the oil present in the same chamber leaks to the oil storage chamber side through the clearance between the inner peripheral surface of the cylindrical hole and the outer peripheral surface of the check valve plug. At this time, the energy of the above impact force is consumed by the flow resistance of the oil, whereby there is obtained a buffer effect to suppress the vibration of the chain.

BRIEF DESCRIPTION OF THE DRAWINGS

All of the objects of the present invention are more fully set forth hereinafter with reference to the accompanying drawings, wherein.

DETAILED DESCRIPTION OF THE PREFERRED EMBODIMENTS

Figure 1A:
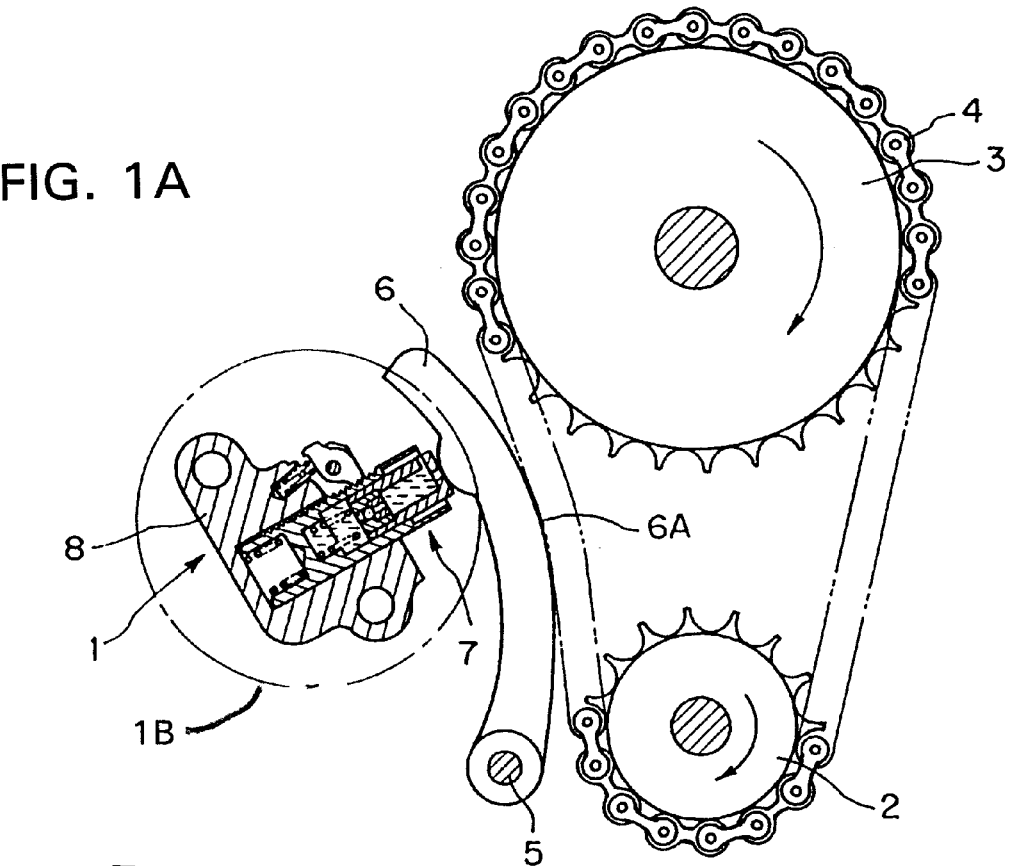
FIG. 1A is a sectional view of a ratchet type tensioner with a buffer mechanism according to a first embodiment of the present invention.
Figure 1B:
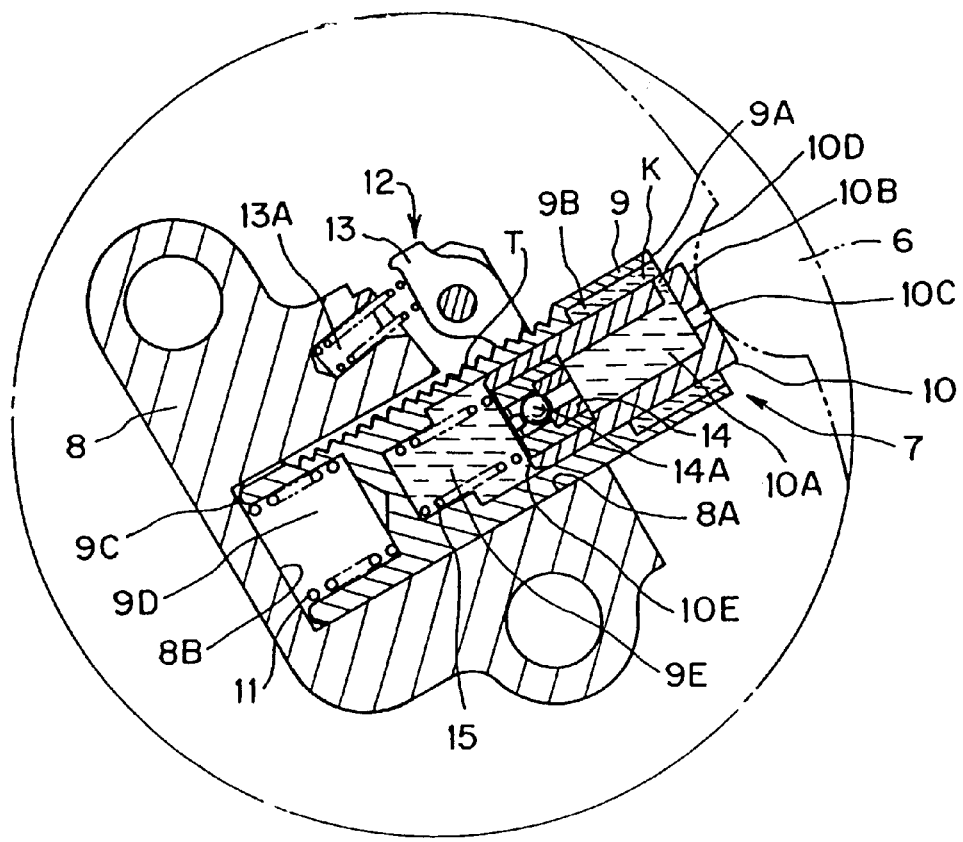
FIG. 1B is an enlarged sectional view of the components within the circle 1B in FIG. 1A.

FIG. 1 is a sectional view of a ratchet type tensioner with a buffer mechanism according to a first embodiment of the present invention. The tensioner, indicated by the reference numeral 1, is disposed near the upper end side of a tensioner lever 6. The tensioner lever 6 is disposed along the outer periphery on a slack side of a chain 4 which is stretched between a driving sprocket 2 and a driven sprocket 3, and the lower end side of the tensioner lever 6 is supported pivotally by a pivot shaft 5.

To be more specific, a plunger 7 of the tensioner 1 pushes the upper end side of the tensioner lever 6 obliquely upward so that a shoe surface 6A of the tensioner lever is in sliding contact with the chain 4 at all times. In a housing 8 of the tensioner 1 is formed a plunger receiving hole 8A which is open on the tensioner lever 6 side, and the plunger 7 is inserted into the plunger receiving hole 8A in a protrudable and retractable manner.

The plunger 7 comprises an outer plunger 9 having an outer peripheral surface conforming to the inner peripheral surface of the plunger receiving hole 8A and an inner plunger 10 inserted in a protrudable and retractable manner into a bottomed, inner plunger receiving hole 9B which is open to a projecting-side end face 9A of the outer plunger 9.

The outer plunger 9 has a spring receiving hole 9D. The spring receiving hole 9D is open to an end face 9C of the outer plunger 9 which end face is opposed to a bottom 8B of the plunger receiving hole 8A. In the interior of the spring receiving hole 9D is accommodated a plunger spring 11 which urges the outer plunger 9 in a projecting direction from the housing 8.

Between the housing 8 and the outer plunger 9 is disposed a ratchet mechanism 12 for restricting the backward movement of the outer plunger 9 with respect to the plunger receiving hole 8A formed in the housing 8. The ratchet mechanism 12 is of a known structure comprising ratchet teeth T formed axially on the outer peripheral surface of the outer plunger 9, a ratchet pawl 13 supported pivotally by the housing 8, and a ratchet spring 13A for urging the ratchet pawl 13 in a direction of engagement with the ratchet teeth T.

On the other hand, in the interior of the inner plunger 10 at one end is formed an oil storage chamber 10A for the storage of oil, and an air vent hole 10C is open to a projecting-side end face 10B of the inner plunger 10. The air vent hole 10C is for discharging the air which has entered the oil storage chamber 10A to the exterior.

Further, an oil flowing hole 10D, which is in communication with the oil storage chamber 10A, is open to the outer peripheral surface of the inner plunger 10 at a position close to the projecting-side end face 10B. In the vicinity of the position where the oil flowing hole 10D is open to the outer peripheral surface of the inner plunger 10, the inside diameter of the inner plunger receiving hole 9B formed in the outer plunger 9 is set larger than the outside diameter of the inner plunger 10 to form therebetween an annular clearance K for the storage of oil.

Between an end face 10E of the inner plunger 10 on the side opposite to the protruding side and the oil storage chamber 10A is disposed a check valve 14 having a check ball 14A to block the flow of oil from the end face 10E side to the oil storage chamber 10A.

Further, in the space between the end face 10E and the bottom of the inner plunger receiving hole 9B is disposed an inner plunger spring 15, which space serves as a high pressure chamber 9E filled with oil. As the inner plunger spring 15 is used a powerful spring having a spring constant larger than that of the plunger spring 11. The inner plunger spring 15 urges the inner plunger 10 at all times in a protruding state from the projecting-side end face 9A of the outer plunger 9.

Upon occurrence of a slack of the chain 4, the outer and inner plungers 9, 10 of the plunger 7 protrude together from the housing 8 by virtue of the plunger spring 11, causing the tensioner lever 6 to pivotally move clockwise about the pivot shaft 5 to impart an appropriate tension to the chain 4. While the outer plunger 9 moves in its protruding direction, the ratchet pawl 13 of the ratchet mechanism 12 does not restrict the movement of the ratchet teeth T, so that the plunger 7 can protrude up to a position of balancing with the tension of the chain 4.

During travel of the chain 4 between the driving sprocket 2 and the driven sprocket 3, if the tension of the chain changes suddenly due to, for example, a change in load torque or a change in the interaxis distance between both sprockets 2 and 3, an impact force will be exerted on the projecting-side end face 10B of the inner plunger 10 through the tensioner lever 6.

Of the outer and inner plungers 9, 10 which constitute the plunger 7, the outer plunger 9 is restricted its backward movement because the ratchet pawl 13 comes into engagement with a ratchet tooth T, so that the above impact force acts to push the inner plunger 10 into the outer plunger 9.

Consequently, the internal pressure of the high pressure chamber 9E becomes higher than the pressure of oil present in the oil storage chamber 10A, causing movement of the check ball 14A to close the check valve 14, and limit flow from the high pressure chamber 9E at one end of the inner plunger to the storage chamber 10A at the opposite end of the inner plunger. As a result, the internal pressure of the high pressure chamber 9E further increases and the oil confined therein leaks to the exterior through the clearance between the inner peripheral surface of the inner plunger receiving hole 9B and the outer peripheral surface of the inner plunger 10. At this time, the energy of the above impact force is consumed by the flow resistance of the leaking oil to create a buffer effect, whereby the vibration of the chain induced by the impact force is suppressed.

On the other hand, the leaking oil is stored in the annular clearance K formed in the vicinity of the position where the oil flowing hole 10D is open. As the impact force acting on the projecting-side end face 10B of the inner plunger 10 decreases, the inner plunger again returns to its projected position by virtue of the inner plunger spring 15. At this time, the check valve 14 opens and the oil present in the oil storage chamber 10A is supplied into the high pressure chamber 9E whose volume was increased by the return of the inner plunger 10. Further, since the internal pressure of the oil storage chamber 10A decreases due to the outflow of oil into the high pressure chamber 9E through the check valve 14, the oil stored in the clearance K passes through the oil flowing hole 10D again into the oil storage chamber 10A.

If air is mixed into the high pressure chamber 9E, the buffer effect will be deteriorated. To avoid this inconvenience, the tensioner 1 of this embodiment is mounted in such a manner that the oil storage chamber 10A side is positioned higher than the high pressure chamber 9E side. By so mounting the tensioner, even if air is mixed into the high pressure chamber 9E, the air rises through the oil, then passes through the clearance between the inner peripheral surface of the inner plunger receiving hole 9B and the outer peripheral surface of the inner plunger 10 and is discharged quickly. Thus, it is possible to prevent deterioration of the buffer effect.

Figure 2A:
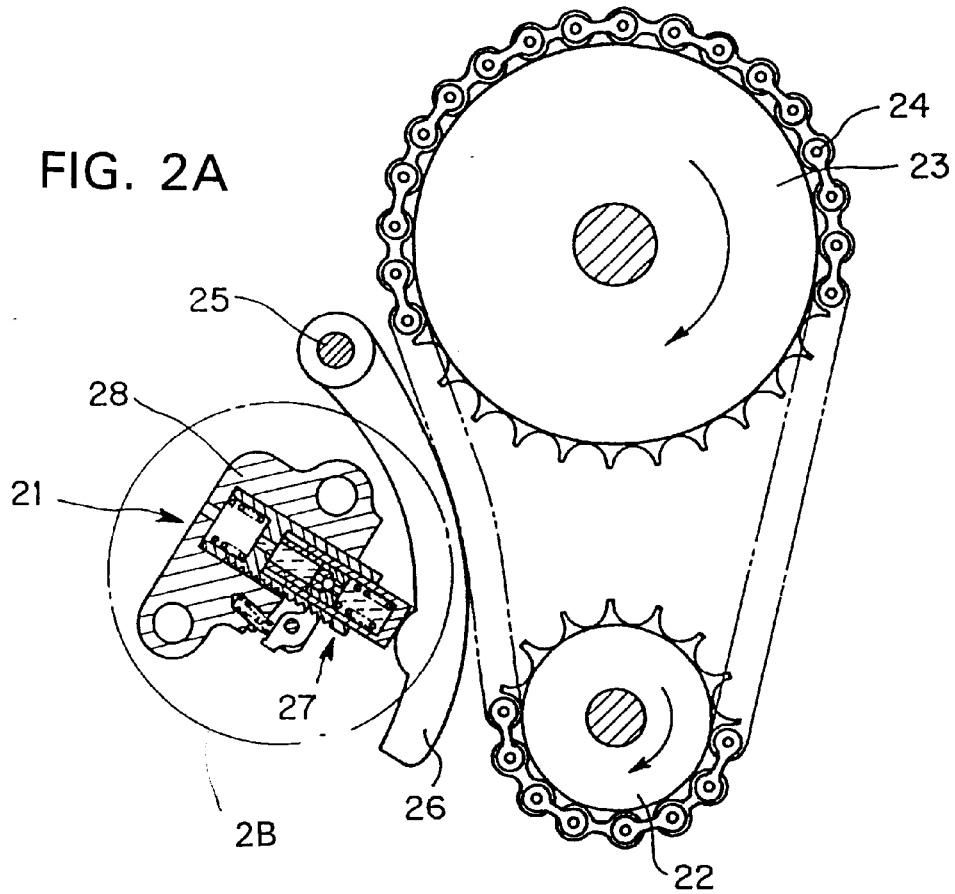
FIG. 2A is a sectional view of a ratchet type tensioner with a buffer mechanism according to a second embodiment of the present invention.
Figure 2B:
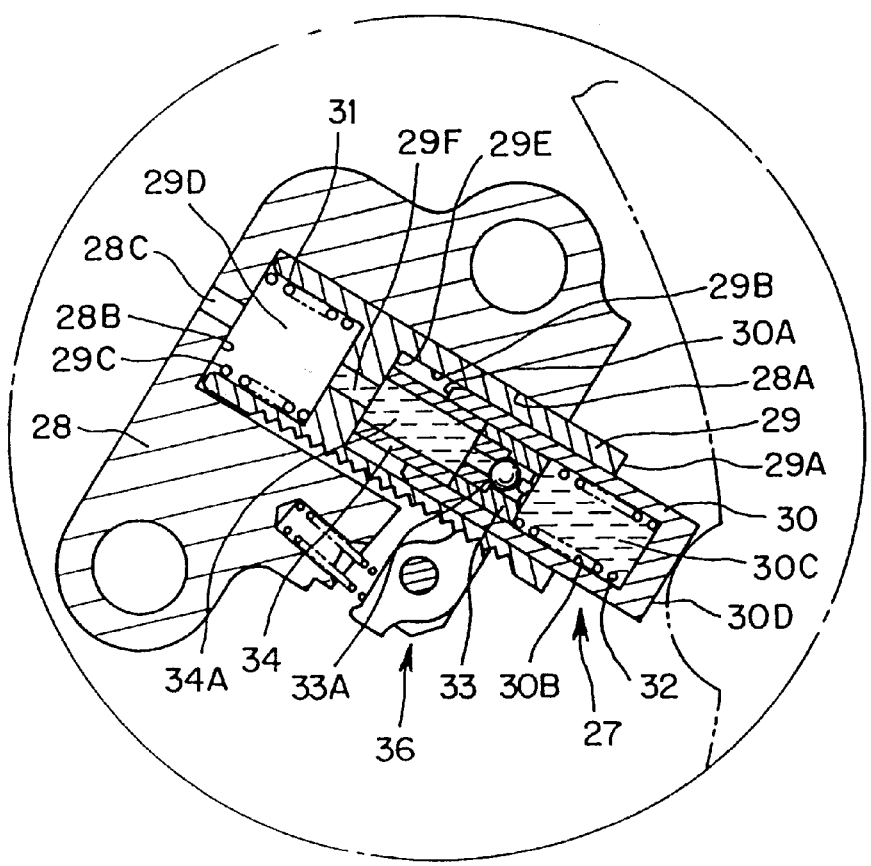
FIG. 2B is an enlarged sectional view of the components within the circle 2B in FIG. 2A.
Figure 3:
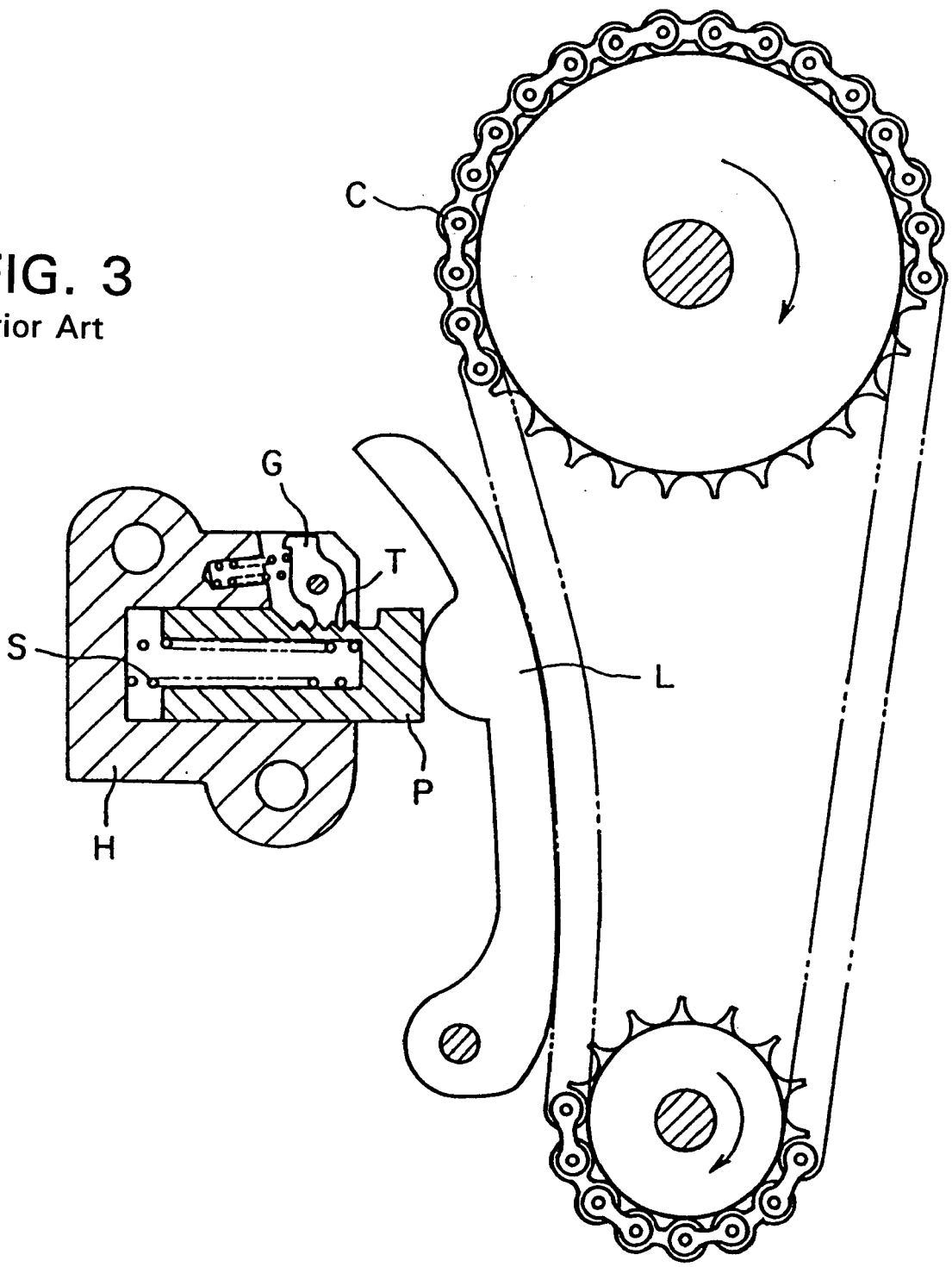
FIG. 3 is a sectional view showing an example of a conventional prior art ratchet type tensioner.
Figure 4:
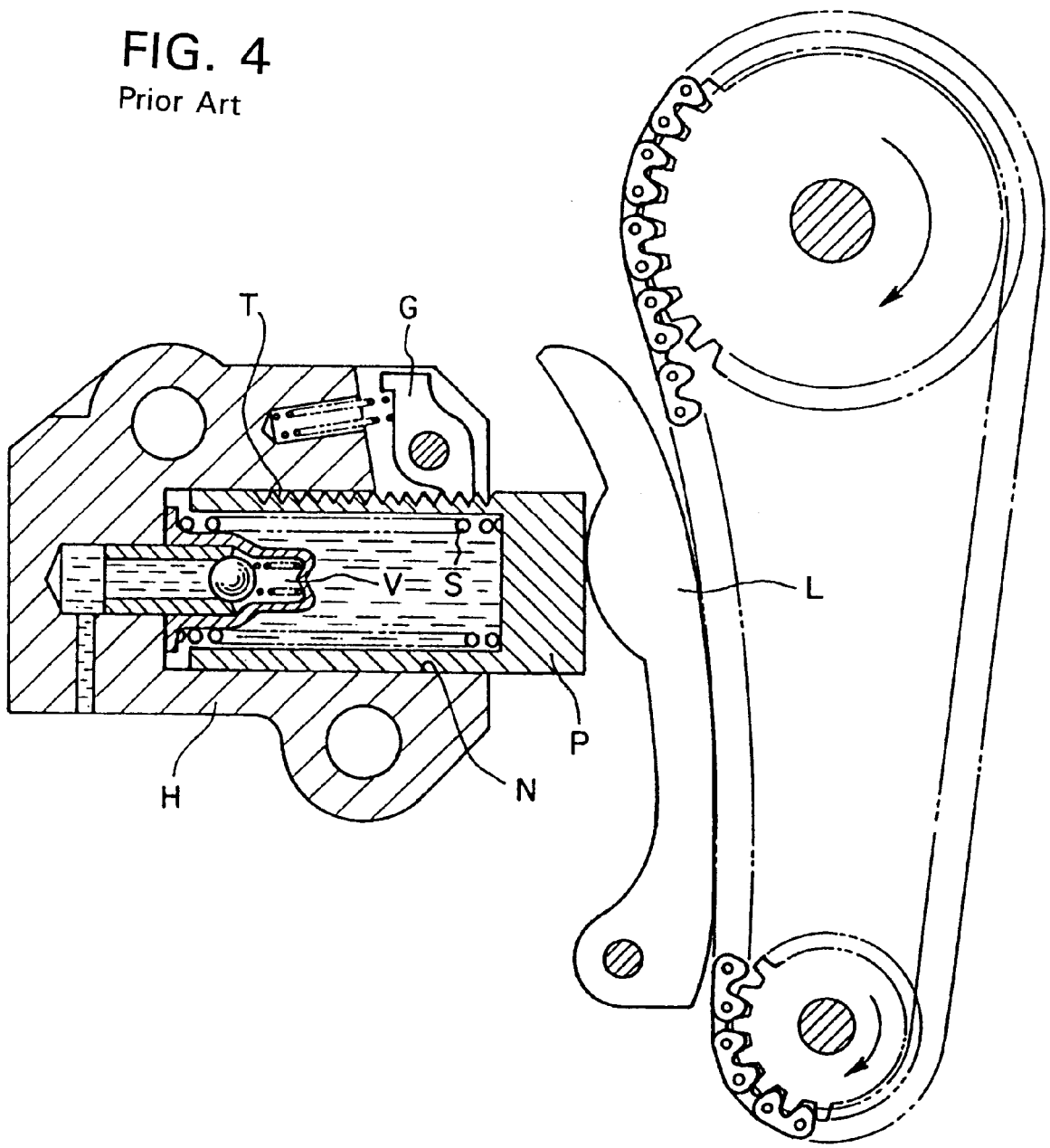
FIG. 4 is a sectional view showing an example of a conventional prior art ratchet type tensioner with a buffer mechanism.
Figure 5:
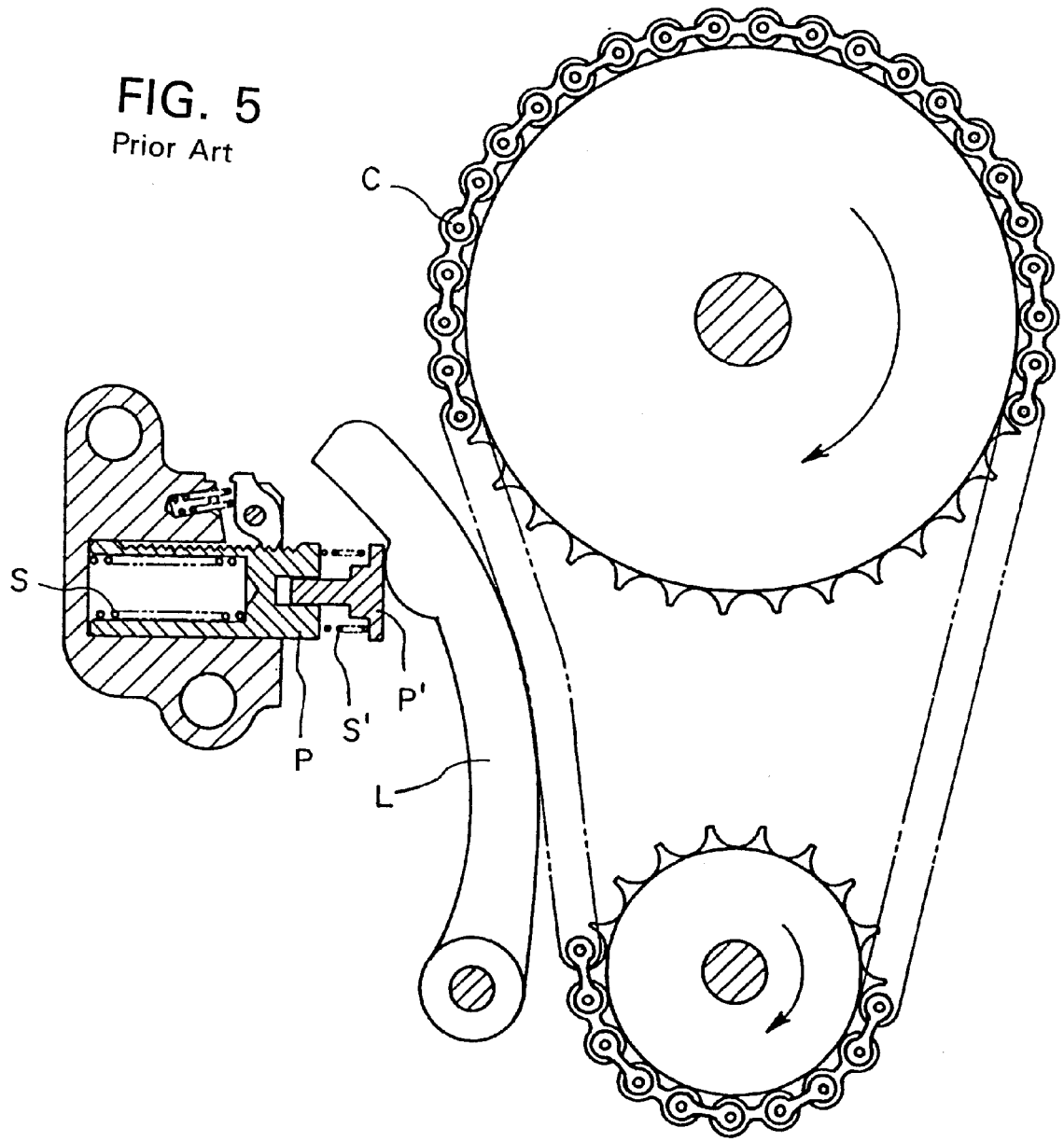
FIG. 5 is a sectional view showing another example of a conventional prior art ratchet type tensioner with a buffer mechanism. Embodiments of the present invention will be described hereunder with reference to the accompanying drawings.

FIG. 2 is a sectional view of a ratchet type tensioner with a buffer mechanism according to a second embodiment of the present invention. The tensioner, indicated by the reference numeral 21, has a plunger 27 which is protruded obliquely downward for pushing the lower end side of a tensioner lever 26 in an obliquely downward direction. The tensioner lever 26 is disposed along the outer periphery on a slack side of a chain 24 which is stretched between a driving sprocket 22 and a driven sprocket 23, and the upper end side of the tensioner lever 26 is supported pivotally by a pivot shaft 25.

The plunger 27 comprises an outer plunger 29 having an outer peripheral surface conforming to the inner peripheral surface of a plunger receiving hole 28A formed in a housing 28, and an inner plunger 30 inserted in a protrudable and retractable manner into a bottomed, inner plunger receiving hole 29B which is open to a projecting-side end face 29A of the outer plunger 29.

The outer plunger 29 has a spring receiving hole 29D which is open to an end face 29C of the outer plunger opposed to a bottom 28B of the plunger receiving hole 28A. In the interior of the spring receiving hole 29D is accommodated a plunger spring 31 which urges the outer plunger 29 in a direction of projecting from the housing 28.

Further, in the bottom 28B of the plunger receiving hole 28A is formed an air vent hole 28C which extends through the housing 28 outward and obliquely upward.

The inner plunger 30 has a bottomed, cylindrical hole 30B which is open to an end face 30A of the inner plunger on the side opposed to a bottom 29E of the inner plunger receiving hole 29B. Into the cylindrical hole 30B are inserted, successively from the bottom side, an inner plunger spring 32 more powerful than the plunger spring 31, a check valve plug 33, and a hollow sleeve 34, slidably in contact with one another. Part of the hollow sleeve 34 projects from the cylindrical hole 30B into the inner plunger receiving hole 29B, and its projecting end is in abutment with the bottom 29E of the inner plunger receiving hole.

In this embodiment, the inner space of the hollow sleeve 34 is formed as an oil storage chamber 34A at one end of the inner plunger 30 for the storage of oil therein. The oil storage chamber 34A is in communication with the spring receiving hole 29D through a communication hole 29F.

The check valve plug 33 is formed in a cylindrical shape having an outer peripheral surface conforming to the inner peripheral surface of the cylindrical hole 30B, and both ends thereof are in communication with each other through a check valve 33A.

The inner space of the cylindrical hole 30 with the inner plunger spring 32 received therein forms a high pressure chamber 30C at the opposite end of the inner plunger 30 filled with oil. The flow of oil through the inner plunger 30 from the high pressure chamber 30C to the oil storage chamber 34A side is limited by the check valve 33A.

Also in the ratchet type tensioner of this embodiment, a ratchet mechanism 36 similar to that used in the first embodiment is disposed between the housing 28 and the outer plunger 29 to restrict the backward movement of the outer plunger 29.

In the above construction, when the chain 24 is driven to travel between the driving sprocket 22 and the driven sprocket 23 and undergoes a change in its tension due to a change in load torque for example, an impact force is imposed on a projecting-side end face 30D of the inner plunger 30, whereupon the ratchet mechanism 36 restricts the backward movement of the outer plunger 29 and hence the inner plunger 30 is pushed into the outer plunger.

Since the interior of the high pressure chamber 30C and that of the oil storage chamber 34A are filled with oil and the movement of the check valve 33A is inhibited by the hollow sleeve 34, the backward movement of the inner plunger 30 results in decrease of the volume of the high pressure chamber 30C. Consequently, the oil present in the same chamber tries to move into the oil storage chamber 34A through the check valve 33A in the check valve plug 33, but in vain because the check valve 33A functions to prevent the movement of oil toward the oil storage chamber 34A. As a result, the pressure of oil in the high pressure chamber 30C increases and the oil leaks to the oil storage chamber 34A in the hollow sleeve 34 through the clearance between the inner peripheral surface of the cylindrical hole 30B and the outer peripheral surface of the check valve plug 33. At this time, the energy of the foregoing impact force is consumed by the flow resistance of the oil, whereby there is obtained a buffer effect to suppress vibration of the chain induced by the impact force.

When the impact force acting on the projecting-side end face 30D of the inner plunger 30, the inner plunger again advances and returns to its projected position by the biasing force of the inner plunger spring 32. At this time, the check valve 33A opens and the oil present in the oil storage chamber 34A is supplied into the high pressure chamber 30C whose volume was increased by the forward movement of the inner plunger 30.

In this embodiment, the air which has entered the oil storage chamber 34A is discharged to the exterior through the communication hole 29F and air vent hole 28C. The oil may be supplied forcibly from the exterior of the housing 21 into the oil storage chamber 34A. For the same reason as that stated in the first embodiment, the tensioner 21 used in this second embodiment is also mounted in such a manner that the oil storage chamber 34A side is positioned higher than the high pressure chamber 30C side.

According to the ratchet type tensioner with a buffer mechanism of the present invention, as set forth above, the plunger is composed of an outer plunger and an inner plunger, the inner plunger is made protrudable and retractable with respect to the outer plunger, and a buffer mechanism is interposed between the two. With this construction, an impact force acting on the chain can be buffered effectively irrespective of the amount of backlash in the ratchet mechanism. Besides, since the energy of the impact force is absorbed by the flow resistance of oil during retraction of the inner plunger with respect to the outer plunger, it is possible to enhance the suppressing effect against vibration of the chain.

While particular embodiments of the invention have been herein illustrated and described, it is not intended to limit the invention to such disclosures, but changes and modifications may be made therein and thereto within the scope of the following claims.

I claim:

1. A ratchet type tensioner having a plunger inserted in a protrudable and retractable manner into a plunger receiving hole formed in a housing, said plunger being urged in a protruding direction from said plunger receiving hole by means of a plunger spring, with a retracting displacement of said plunger into the plunger receiving hole being restricted by a ratchet mechanism, characterized in that:

said plunger comprises an outer plunger inserted into said plunger receiving hole and an inner plunger inserted into a bottomed, inner plunger receiving hole and capable of protruding and retracting in the same direction as the extending direction of said outer plunger, said inner plunger receiving hole being formed inside said outer plunger and being open to an end face on the protruding side of the outer plunger;

said inner plunger is urged in the protruding direction from said inner plunger receiving hole by means of an inner plunger spring having a biasing force stronger than that of said plunger spring, and an oil storage chamber is formed in the interior of said inner plunger, and said oil storage chamber being in communication through a check valve with a high pressure chamber formed between the bottom of said inner plunger receiving hole and said inner plunger; and said check valve blocks the flow of oil from said high pressure chamber side to said oil storage chamber side so that, when an impact load is imposed on the protruding end of said inner plunger, the oil filled in the high pressure chamber leaks through a clearance between the inner peripheral surface of said inner plunger receiving hole and the outer peripheral surface of the inner plunger to buffer the impact load.

2. A ratchet type tensioner having a plunger inserted in a protrudable and retractable manner into a plunger receiving hole formed in a housing, said plunger being urged in a protruding direction from said plunger receiving hole by means of a plunger spring, with a retracting displacement of said plunger into the plunger receiving hole being restricted by a ratchet mechanism, characterized in that: said plunger comprises an outer plunger inserted into said plunger receiving hole and an inner plunger inserted into a bottomed, inner plunger receiving hole and capable of protruding and retracting in the same direction as the extending direction of said outer plunger, said inner plunger receiving hole being formed inside said outer plunger and being open to an end face on the protruding side of the outer plunger; said inner plunger has a bottomed, cylindrical hole which is open to an end face of the inner plunger on the side opposed to said inner plunger receiving hole; into said cylindrical hole are inserted an inner plunger spring having a biasing force stronger than that of said plunger spring, a check valve plug, and a hollow sleeve, in this order from the bottom side of the cylindrical hole and slidably in abutment with one another;

said check valve plug is formed in a cylindrical shape having an outer peripheral surface conforming to the inner peripheral surface of said cylindrical hole, both end faces of the check valve plug being in communication with each other through a check valve;

said hollow sleeve projects into said inner plunger receiving hole and its projecting end is in abutment with the bottom of said inner plunger receiving hole;

said inner plunger is urged in a direction of projecting to the exterior from the inner plunger receiving hole by means of said inner plunger spring;

a high pressure chamber is formed between the bottom of said cylindrical hole and said check valve plug, and an oil storage chamber is formed by the internal space of said hollow sleeve; and said check valve blocks the flow of oil from said high pressure chamber side to said oil storage chamber side so that, when an impact load is imposed on the protruding end of said inner plunger, the oil filled in the high pressure chamber passes through a clearance between the inner peripheral surface of said cylindrical hole and the outer peripheral surface of said check valve plug and leaks to the oil storage chamber side to buffer the impact load.

3. A ratchet type tensioner having a housing with a plunger receiving hole, a plunger spring, a plunger inserted in a protrudable and retractable manner into said plunger receiving hole, said plunger being urged by said spring in a protruding direction from said plunger receiving hole, and a ratchet mechanism restricting retracting displacement of said plunger into said plunger receiving hole, said plunger comprising an outer plunger inserted into said plunger receiving hole and having a bottomed, inner plunger receiving hole formed inside said outer plunger and being open to an end face on the protruding side of the outer plunger, an inner plunger in said inner plunger hole and capable of protruding and retracting in the same direction as the extending direction of said outer plunger;

a high pressure chamber formed at one end of said inner plunger;

said tensioner comprising an inner plunger spring having a biasing force stronger than that of said plunger spring urging said inner plunger in the protruding direction from said inner plunger receiving hole;

an oil storage chamber formed at the opposite end of said inner plunger, said oil storage chamber having a check valve in communication with said high pressure chamber, said check valve blocking the flow of oil from said high pressure chamber to said oil storage chamber; and a clearance to permit the oil in the high pressure chamber to leak through the clearance from the high pressure chamber to the storage chamber when an impact load is imposed on the protruding end of said inner plunger, to thereby buffer the impact load.

4. A ratchet type tensioner according to claim 3, wherein said high pressure chamber is formed between the bottom of said inner plunger receiving hole and said inner plunger, and said oil storage chamber is formed in the interior of said inner plunger, said clearance being between the inner peripheral surface of the inner plunger receiving hole and the outer peripheral surface of said inner plunger.

5. A ratchet type tensioner according to claim 3, wherein said inner plunger has a bottomed, cylindrical hole which is open to an end face of the inner plunger on the side opposed to said inner plunger receiving hole, a check valve plug, and a hollow sleeve, in this order from the bottom side of the cylindrical hole and slidably in abutment with one another, said check valve plug being cylindrical in shape having an outer peripheral surface conforming to the inner peripheral surface of said cylindrical hole of said inner plunger, the check valve plug having opposite end faces in communication with each other through said check valve;

said hollow sleeve projects into said inner plunger receiving hole and its projecting end is in abutment with the bottom of said inner plunger receiving hole to form said oil storage chamber within said hollow sleeve confronting one of said end faces of said check valve plug, said high pressure chamber being formed between the bottom of said cylindrical hole and the opposite end faces of said check valve plug; and said clearance being between said outer periphery of the check valve plug and said inner peripheral surface of the cylindrical hole of said inner plunger.

* * * * *